US012447297B2

(12) United States Patent
Cao et al.

(10) Patent No.: US 12,447,297 B2
(45) Date of Patent: Oct. 21, 2025

(54) TRACHEAL INTUBATION WITH AUTOMATIC SPUTUM EXCRETION BY UNIDIRECTIONAL SPUTUM FLOW

(71) Applicant: The Second Affiliated Hospital of XJTU, Xi'an (CN)

(72) Inventors: Lei Cao, Xi'an (CN); Wei Li, Xi'an (CN); Yongxiao Cao, Xi'an (CN)

(73) Assignee: The Second Affiliated Hospital of XJTU, Xi'an (CN)

( * ) Notice: Subject to any disclaimer, the term of this patent is extended or adjusted under 35 U.S.C. 154(b) by 629 days.

(21) Appl. No.: 17/943,041

(22) Filed: Sep. 12, 2022

(65) Prior Publication Data

US 2023/0364370 A1    Nov. 16, 2023

(30) Foreign Application Priority Data

May 12, 2022   (CN) .......................... 202210519378.7

(51) Int. Cl.
*A61M 16/04*        (2006.01)

(52) U.S. Cl.
CPC ........ *A61M 16/04* (2013.01); *A61M 16/0402* (2014.02); *A61M 16/0477* (2014.02)

(58) Field of Classification Search
CPC .............. A61M 16/04; A61M 16/0402; A61M 16/0463; A61M 16/0431; A61M 16/0477; A61M 25/0023; A61M 25/0052; A61M 2025/006; A61M 2025/0062; A61M 2025/0073
See application file for complete search history.

(56) References Cited

U.S. PATENT DOCUMENTS

| | | | | | |
|---|---|---|---|---|---|
| 5,832,920 | A | * | 11/1998 | Field | A61M 16/0463 128/207.14 |
| 7,866,374 | B2 | * | 1/2011 | Hou | F28D 15/046 29/890.032 |
| 2008/0257355 | A1 | * | 10/2008 | Rao | A61L 2/16 128/207.14 |
| 2009/0217981 | A1 | * | 9/2009 | Extrand | F16K 99/0017 134/22.18 |
| 2011/0023885 | A1 | * | 2/2011 | Vazales | A61M 16/0472 128/207.14 |
| 2016/0296719 | A1 | * | 10/2016 | Geraghty | A61M 16/085 |

FOREIGN PATENT DOCUMENTS

JP            2012170792 A  *  9/2012

* cited by examiner

*Primary Examiner* — Colin W Stuart
*Assistant Examiner* — Douglas Y Sul
(74) *Attorney, Agent, or Firm* — EVAN LAW GROUP LLC (57) ABSTRACT

A tracheal intubation with automatic sputum excretion by unidirectional sputum flow is disclosed and includes a layer of unidirectional sputum-flow structure laid in an inner wall of the endotracheal tube. The unidirectional sputum-flow structure includes multiple partition plates evenly arranged on the inner wall in a circumferential direction, and lengthwise directions of the partition plates are the same direction as an axial direction of the tracheal intubation, widthwise directions of the partition plates is in radial directions of the tracheal intubation, and multiple curved plates are provided at intervals between two adjacent partition plates, one end of each curved plate away from the inner wall bends towards one end of the tracheal intubation, and curved directions of the curved plates are the same.

4 Claims, 8 Drawing Sheets

TRACHEAL INTUBATION WITH AUTOMATIC SPUTUM EXCRETION BY UNIDIRECTIONAL SPUTUM FLOW

CROSS REFERENCE TO RELATED APPLICATION

This application claims the priority of Chinese Patent Application No. 202210519378.7, entitled "TRACHEAL INTUBATION WITH AUTOMATIC SPUTUM EXCRETION BY UNIDIRECTIONAL SPUTUM FLOW" filed with the Chinese Patent National Intellectual Property Administration on 12 May, 2022, which is incorporated herein by reference in its entirety.

TECHNICAL FIELD

The present disclosure relates to the technical field of medical devices, and in particular, to a tracheal intubation with automatic sputum excretion by unidirectional sputum flow.

BACKGROUND ART

A tracheal intubation is a medical device for maintaining an open respiratory tract and maintaining ventilation, and plays an important role in life-saving. Cilia at tops of columnar epithelial cells on a mucosal layer of a trachea wall have the effect of eliminating excreta and sputum from the respiratory tract, and can promote the excretion of sputum.

However, current tracheal intubations are made of rigid physical materials and lack the function of sputum excretion. During expiration, sputum in the intubation is expelled under the pushing of expiratory airflow. However, because the intubation is long, only a few excreta can be expelled in one breath, and most of excreta will return under the action of expiratory airflow during expiration, are detained in the trachea, and are not easy to expel. Furthermore, a tracheal intubation stimulates mucus excreta from goblet cells of the respiratory tract, increasing the amount of sputum, increasing the burden of sputum excretion from the respiratory tract, and increasing the risk of infection and the obstruction of the respiratory tract.

SUMMARY

The present disclosure aims to provide a tracheal intubation with automatic sputum excretion by unidirectional sputum flow, so as to solve the problem existing in the prior art, and enhance the effect of sputum excretion of the tracheal intubation.

To achieve the above object, the present disclosure provides the following solutions:

The present disclosure provides a tracheal intubation with automatic sputum excretion by unidirectional sputum flow. A layer of unidirectional sputum-flow structure is laid on an inner wall of the tracheal intubation; the unidirectional sputum-flow structure comprises a plurality of partition plates evenly arranged on the inner wall in a circumferential direction, and a lengthwise direction of each of the plurality of partition plates is the same as an axial direction of the tracheal intubation, a widthwise direction of each of the plurality of partition plates is the same as a radial direction of the tracheal intubation, and a plurality of curved plates are provided at intervals between adjacent two of the plurality of partition plates, one end of each curved plate away from the inner wall bends towards one end of the tracheal intubation, and curved directions of the plurality of curved plates are the same.

In some embodiments, the plurality of curved plates are hermetically connected to the inner wall of the tracheal intubation, and the plurality of curved plates are hermetically connected to partition plates that are adjacent to the plurality of curved plates.

In some embodiments, a hook-shaped portion is further provided at the one end of each curved plate away from the inner wall, the hook-shaped portion is L-shaped, and one end of the hook-shaped portion away from a curved plate is parallel to the inner wall and faces the curved plate.

In some embodiments, one end of each partition plate away from the inner wall is closer to a center of the tracheal intubation than the one end of each curved plate away from the inner wall.

In some embodiments, the plurality of partition plates are evenly distributed on the inner wall in the circumferential direction of 360 degrees.

The present disclosure achieves the following technical effects with respect to the prior art:

The tracheal intubation with automatic sputum excretion by unidirectional sputum flow has a good sputum excretion effect. The unidirectional sputum-flow structure is provided in the inner wall of the tracheal intubation with automatic sputum excretion by unidirectional sputum flow in the present disclosure. A concave structure is formed between the hook-shaped portion at the one end of the curved plate and the curved plate, and the concave structure has a hydrophobic function and hinders the flow of sputum. A liquid reservoir is formed between two adjacent curved plates and partition plates on two sides of the curved plates. As sputum overflowing out of the liquid reservoir flows at the one end of the curved plate, because the resistance applied to the concave structure is obviously different, the sputum tends to flow unidirectionally to one side with lower resistance, accelerating the outflow of sputum during exhalation, preventing the reverse flow of sputum during expiration, thereby greatly reducing the retention of sputum in the respiratory tract. Therefore, the number of times of sputum inhalation is reduced, the residence time is prolonged, and the occurrence rate of respiratory infections is reduced.

BRIEF DESCRIPTION OF THE DRAWINGS

In order to more clearly illustrate the embodiments of the disclosure or the technical solutions in the prior art, the drawings required in the embodiments will be briefly described below, it is obvious that the drawings in the following description are only some embodiments of the disclosure, for those skilled in the art, other drawings can be obtained according to the drawings without inventive labors.

List of the reference numerals: 1. tracheal intubation with automatic sputum excretion by unidirectional sputum flow; 2. inner wall; 3. unidirectional sputum-flow structure; 4. curved plate; 5. partition plate; 6. liquid reservoir; 7. hook-shaped portion; 8. liquid; 9. solid; 10. tube wall.

DETAILED DESCRIPTION OF THE EMBODIMENTS

The technical solutions in the embodiments of the present disclosure will be clearly and completely described below combining with the accompanying drawings in the embodiments of the present disclosure, and it is obvious that the embodiments described are only a part rather than all of the embodiments of the present disclosure. All other embodiments, which are obtained by those skilled in the art based on the embodiments of the present disclosure without creative labors, shall fall within the protection scope of the present disclosure.

The disclosure aims to provide tracheal intubation with automatic sputum excretion by unidirectional sputum flow, so as to solve the problem in the prior art, and enhance the sputum excretion effect of the tracheal intubation.

In order to make the above purposes, features and advantages of the present disclosure more comprehensible, the present disclosure is further and detailedly described combining with the accompanying drawings and specific embodiments thereof.

As shown in FIGS. 1-13: the present embodiment provides a tracheal intubation with automatic sputum excretion by unidirectional sputum flow 1, wherein a layer of unidirectional sputum-flow structure 3 is laid in an inner wall 2 of the tracheal intubation.

In this embodiment, the unidirectional sputum-flow structure 3 specifically includes a plurality of partition plates 5 evenly distributed on the inner wall 2 of the tracheal intubation in a circumferential direction. The lengthwise directions of the partition plates 5 are the same as the axial direction of the tracheal intubation, and the widthwise directions of the partition plates 5 are the same as the radial directions of the tracheal intubation. A plurality of curved plates 4 are provided at intervals between any two adjacent partition plates 5. One end of each curved plate 4 away from the inner wall 2 of the tracheal intubation bends towards one end of the tracheal intubation, and different curved plates 4 have the same curved direction. The one end of the curved plate 4 away from the inner wall 2 of the tracheal intubation is directed towards the inside of the patient's lungs when the tracheal intubation with automatic sputum excretion by unidirectional sputum flow is used.

The curved plates 4 are hermetically connected to the inner wall 2 of the tracheal intubation, and each curved plate 4 is hermetically connected to the partition plates 5 adjacent to the curved plate. A liquid reservoir 6 is formed between every two adjacent curved plates 4 and the partition plates 5 on two sides.

A hook-shaped portion 7 is further provided at one end of each curved plate 4 away from the inner wall 2 of the tracheal intubation. The hook-shaped portion 7 is L-shaped, and one end of the hook-shaped portion 7 away from the curved plate 4 is parallel to the inner wall 2 of the tracheal intubation and faces the curved plate 4. One end of the partition plate 5 away from the inner wall 2 is closer to a center of the tracheal intubation than the one end of the curved plate 4 away from the inner wall 2.

FIGS. 5 to 12 are schematic diagrams of a liquid contact angle of a surface of a material. A wetting phenomenon is caused by asymmetric molecular force. The adhesive layer is a layer of liquid 8 at an effective action radius of molecules of the liquid 8 or the solid 9 where the solid 9 is in contact with the liquid 8. Adhesion force $f_{adhesion}$ is the sum of molecular attractive forces of the solid 9 applied to the adhesive layer, and cohesion force $f_{cohesion}$ is the sum of molecular attractive forces of the liquid 8 applied to the adhesive layer. When $f_{adhesion}$ is greater than $f_{cohesion}$, the resultant force f applied to the adhesive layer is perpendicular to the adhesive layer and points to the solid 9; the intermolecular potential energy of the liquid 8 is greater than the intermolecular potential energy of the adhesive layer; and the molecules of the liquid 8 are pushed into the adhesive layer as far as possible, so that the adhesive layer expands, and the liquid 8 wets the solid 9. When $f_{adhesion}$ is less than $f_{cohesion}$, the resultant force f applied to the adhesive layer is perpendicular to the adhesive layer and points to the interior of the liquid 8, the intermolecular potential energy of the liquid 8 is less than the intermolecular potential energy of the adhesive layer, and the molecules of the adhesive layer are pushed into the interior of the liquid 8 as far as possible, so that the adhesive layer shrinks, and the liquid 8 does not wet the solid 9. The surface energy is the energy of the surface of the material with respect to the interior of the material, and the surface energy per unit area of the liquid 8 is the surface tension. Wetting is often studied by means of contact angle. The contact angle is an included angle between a gas-liquid interface and a solid-liquid interface at an intersection of gas, liquid, and solid phases, that is, an included angle between a tangential line of a surface of a liquid 8 and a surface of a solid 9 that surrounds the liquid 8 at a boundary of contact surface of the liquid 8 and the solid 9, and is represented by θ, which is a measure of the degree of wetting. If θ<90 degrees, the solid 9 is lyophilic, i. e. the liquid 8 can wet the solid 9, and the smaller the angle is, the better the wettability is. If θ>90 degrees, the solid 9 is lyophobic, i. e. the liquid 8 does not wet the solid 9 and cannot enter the capillary. The contact angle includes an intrinsic contact angle ($θ_Y$), an apparent contact angle (θmax), a rolling angle (θs), an advancing angle ($θ_A$), a receding angle ($θ_R$), etc. The intrinsic contact angle is the contact angle of the liquid 8 on the surface of the smooth solid 9, and the apparent contact angle is the contact angle measured when the surface of the solid 9 is rough. The wetting process is related to the interfacial tension of the system. When a drop of liquid 8 falls on the surface of a horizontal solid 9 and reaches equilibrium, the relationship of the contact angle formed and each interfacial tension is a formula as follow: Fsg=Fsl+Fgl×cosθ, where Fsg represents solid-gas interfacial tension, Fsl represents solid-liquid interfacial tension, and Fgl represents gas-liquid interfacial tension.

Droplets that rest on the surface of a horizontal solid 9 have a pressure at any point on the surface equal to atmospheric pressure, and the contact angles between the liquid 8 and the solid 9 in any direction are the same. If the contact angle at a certain contact point changes, the contact angles at other points also change correspondingly, and finally tend to be consistent. Stationary liquid 8 has a stabilizing effect and remains stationary in place. If the stationary liquid 8 flows, additional energy is required to break its symmetry of stationary and overcome the stabilizing effect with a structural surface of the solid 9.

Figure 3:
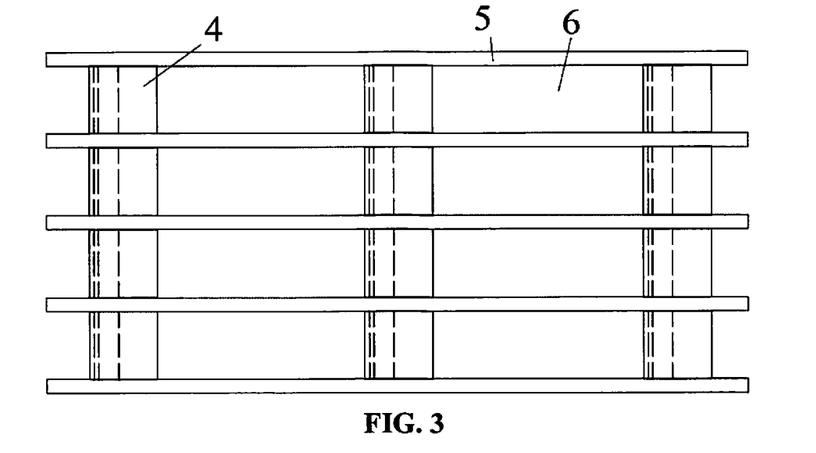
FIG. 3 is a structural schematic diagram of a unidirectional flow structure in an tracheal intubation with automatic sputum excretion by unidirectional sputum flow according to the present disclosure.
Figure 4:
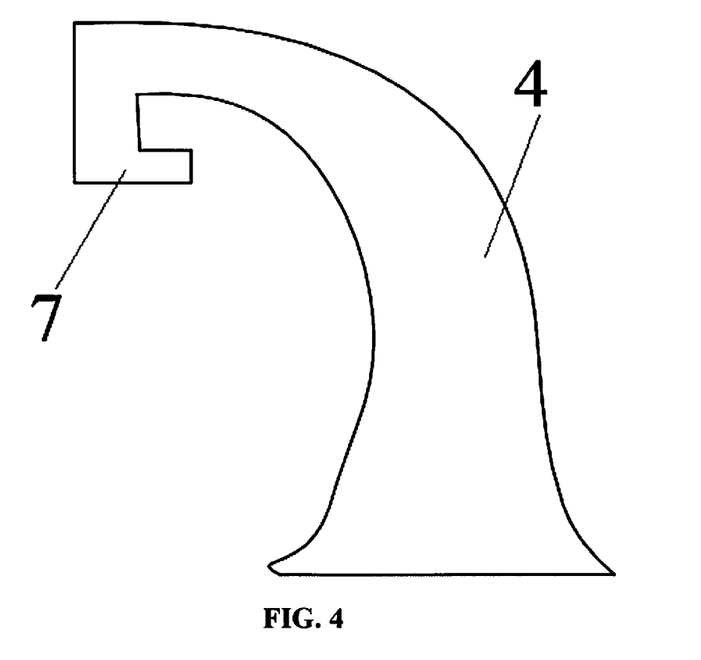
FIG. 4 is a structural schematic diagram of a curved plate of an tracheal intubation with automatic sputum excretion by unidirectional sputum flow according to the present disclosure.
Figure 5:
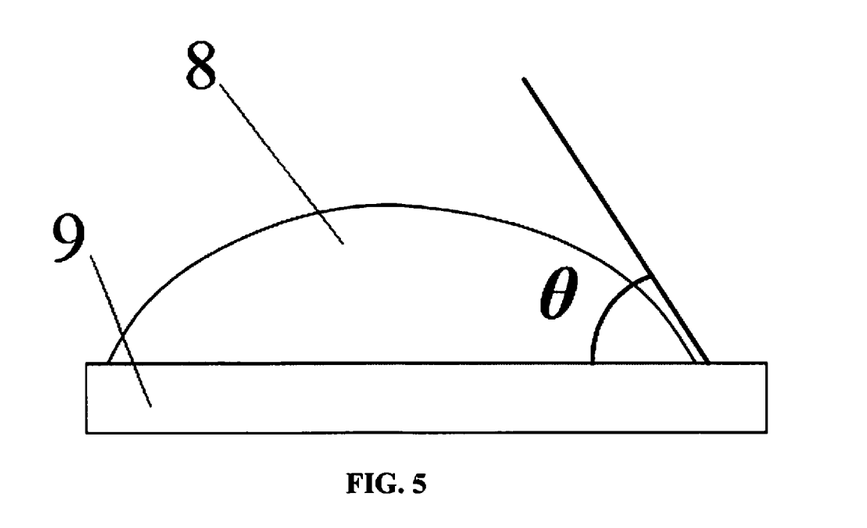
FIG. 5 is a first structural schematic diagram of a contact angle of a surface of a material.
Figure 6:
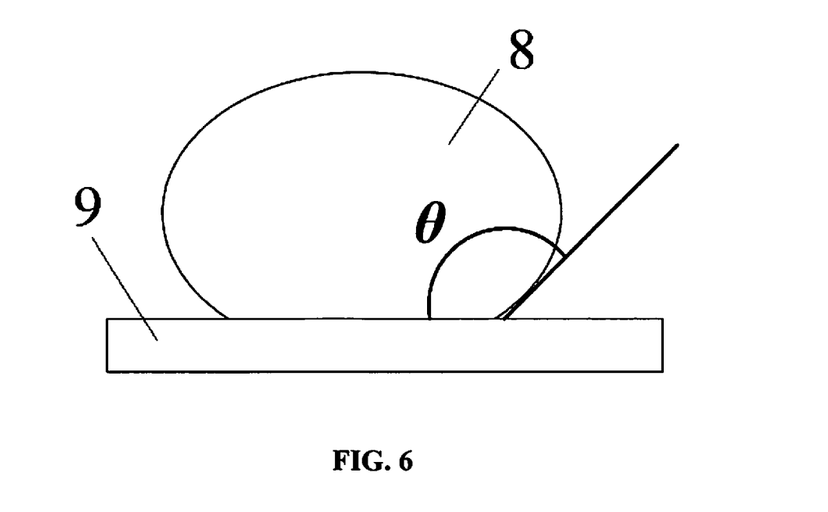
FIG. 6 is a second structural schematic diagram of a contact angle of a surface of a material.
Figure 7:
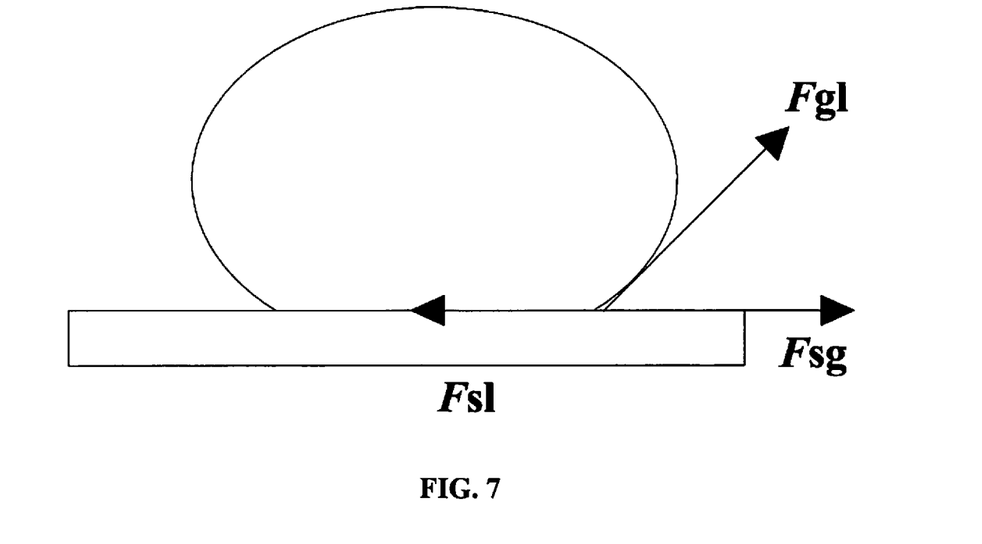
FIG. 7 is a third structural schematic diagram of a contact angle of a surface of a material.
Figure 8:
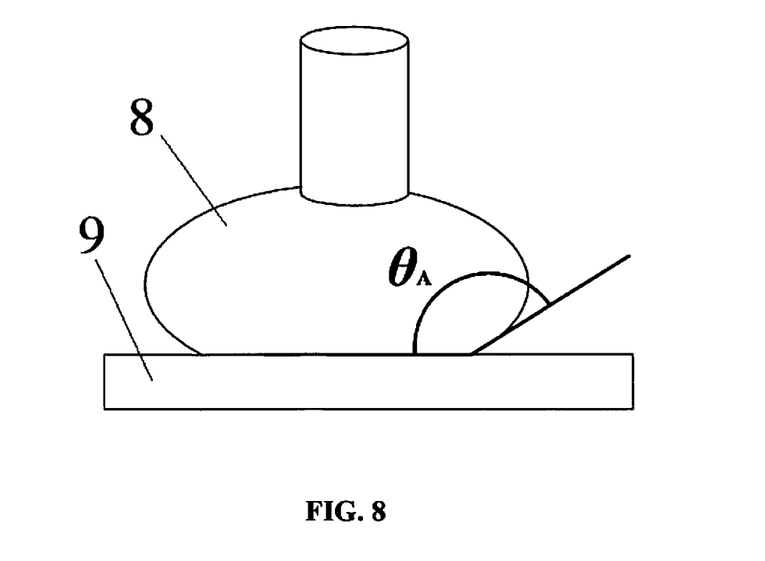
FIG. 8 is a fourth structural schematic diagram of a contact angle of a surface of a material.
Figure 9:
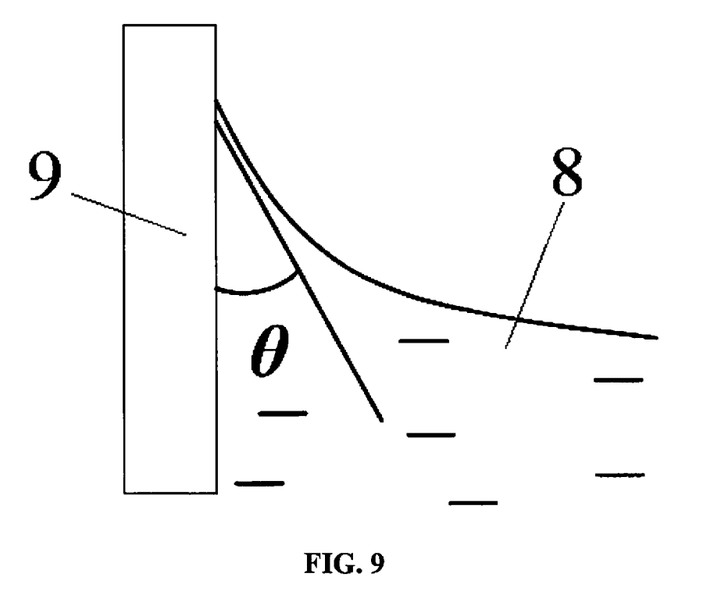
FIG. 9 is a fifth structural schematic diagram of a contact angle of a surface of a material.
Figure 10:
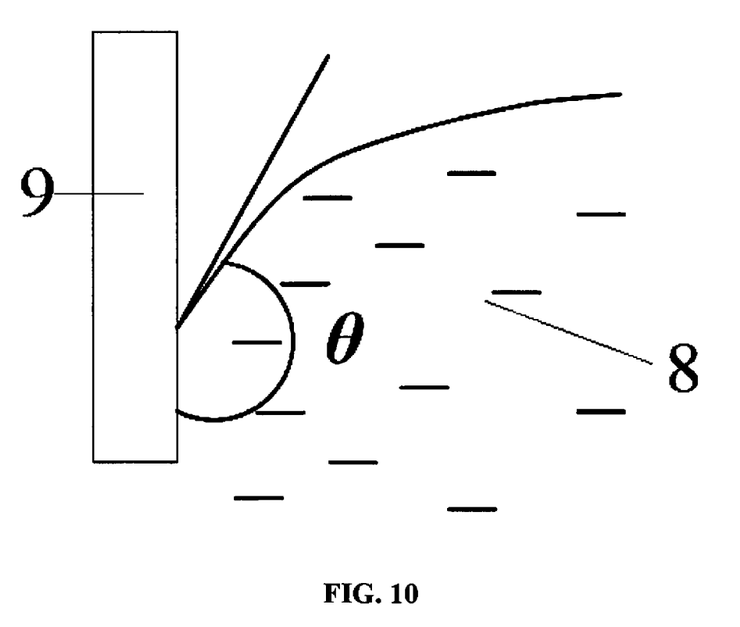
FIG. 10 is a sixth structural schematic diagram of a contact angle of a surface of a material.
Figure 11:
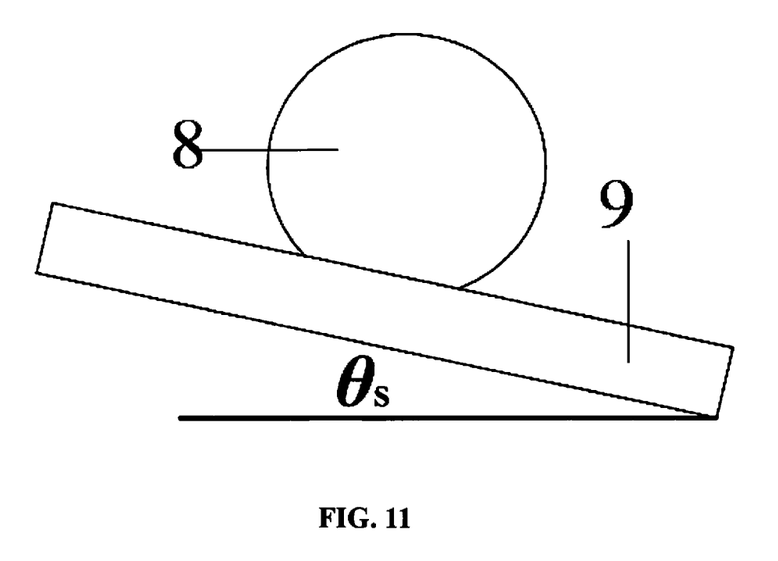
FIG. 11 is a seventh structural schematic diagram of a contact angle of a surface of a material.
Figure 12:
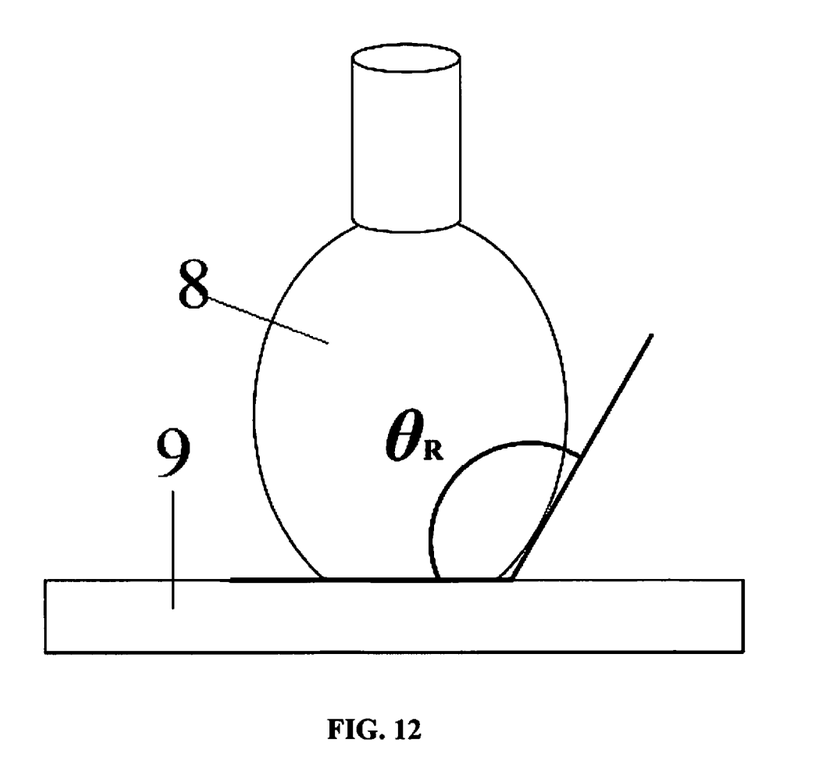
FIG. 12 is an eighth structural schematic diagram of a contact angle of a surface of a material.

As shown in FIGS. 3 and 4, in order to achieve the directional and autonomous flow of the fluid, the unidirectional sputum-flow structure 3 is designed. The unidirectional sputum-flow structure 3 includes two adjacent curved plates 4. The curved plates 4 are fishhook-shaped and are arranged in parallel. Two adjacent curved plates 4 and partition plates 55 on two sides form a liquid reservoir 6. When the sputum overflowing from the liquid reservoir 6 moves to two sides, because the resistance subjected by the concave structure at the tip of the hook is obviously different, the resistance difference between the two sides makes the sputum tend to move unidirectionally to one side with a low resistance. Such a structure can transmit a liquid with a low surface energy and a liquid with a high viscosity, such as sputum, pus, bile, exudation, pleural effusion, peritoneal effusion, and joint effusion, and can even be transmitted against the gravity.

Figure 13:
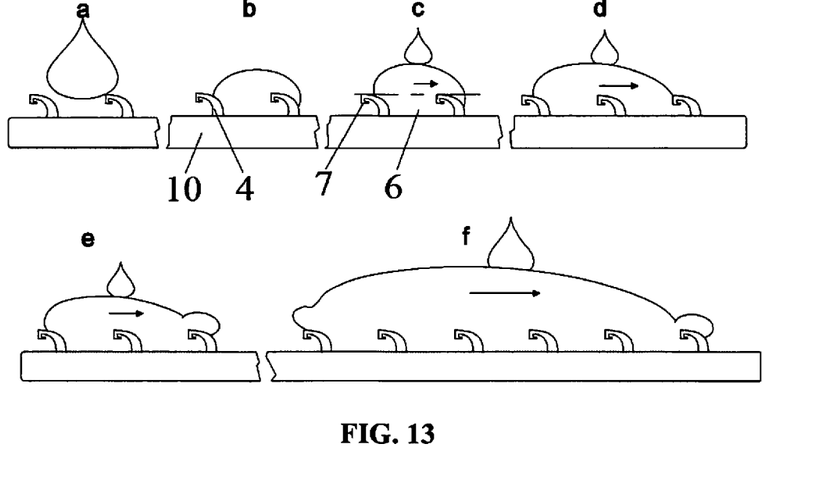
FIG. 13 is a schematic diagram illustrating the unidirectional movement of sputum in an tracheal intubation with automatic sputum excretion by unidirectional sputum flow according to the present disclosure.

FIG. 13 is a schematic diagram of the unidirectional movement of sputum on the tube wall 10 of a tracheal intubation 1 with automatic sputum excretion by unidirectional sputum flow, which can explain the principle of the unidirectional movement of the liquid. In this embodiment, a cross section of the curved plate 4 is fishhook-shaped, the cross section of the curved plate 4 is curved. A hook tip of the curved plate 4 is designed as a hook-shaped portion 7, which form inwards a groove. Two adjacent curved plates 4 are arranged in parallel, and the liquid reservoir 6 is formed by a partition plate 5 on two sides. When sputum in an airflow enters the liquid reservoir and fills the liquid reservoir 6, and exceed the volume of the liquid reservoir 6, excess sputum may overflow. Overflowing sputum is higher than a plane of the liquid reservoir due to the existence of surface tension of sputum. The overflowing sputum is attached to an outer edge of a right side curved plate 4, when a liquid droplet is added continuously to the liquid level, the area of the liquid level needs to be increased. It can be realized by increasing the height of a left convex surface and a liquid surface contact point, or by reducing the height of a right convex surface and a liquid surface contact point. Obviously, the latter is easier, therefore, the sputum added to the liquid level continuously quickly flow into the right liquid reservoir 6, and the liquid levels on both sides of the liquid reservoir 6 decrease, and then gradually increase. Since the sputum has a speed and a kinetic energy during entering the liquid reservoir 6, the rising speed of the liquid level of a right curve is larger than that of the liquid level of a left convex. When the liquid level of the right curve reaches the top, the liquid level of the left convex is still on its way to the top, and when the liquid level of the left convex quickly reaches the top, the liquid level of the right curve has already exceeded the top and starts to descend; at this time, the liquid level of the left convex also stops rising and starts to descend. Then, the next process of filling reservoir, and rising and descending the liquid level is repeated, and the sputum moves to the right in this continuous repeated process.

When continuing to add energy to the liquid level, i. e., increasing the amount of liquid droplets, as the liquid level in the liquid reservoir 6 gradually increases, the sputum at the top of the leftmost curved plate 4 is difficult to move to the left, because when the sputum at the top attempts to wet the concave structure below from above, the concave surface is a hydrophobic three-fold structure, and droplets above the concave surface are difficult to wet, that is to say, if the concave surface is intended to be wet, a great energy Emax is required to be applied to the liquid level. When the energy applied to the liquid level is lower than Emax and equal to Ex, the liquid level on the right side has exceeded the convex surface of the right curved plate 4, and starts to flow to the liquid reservoir 6 on the right side, and the liquid level has started to descend. If Emax-Ex is referred to as a reserved energy Es, the magnitude of Es determines the distance that sputum flows distally and/or the height that is transported upward against gravity.

Figure 1:
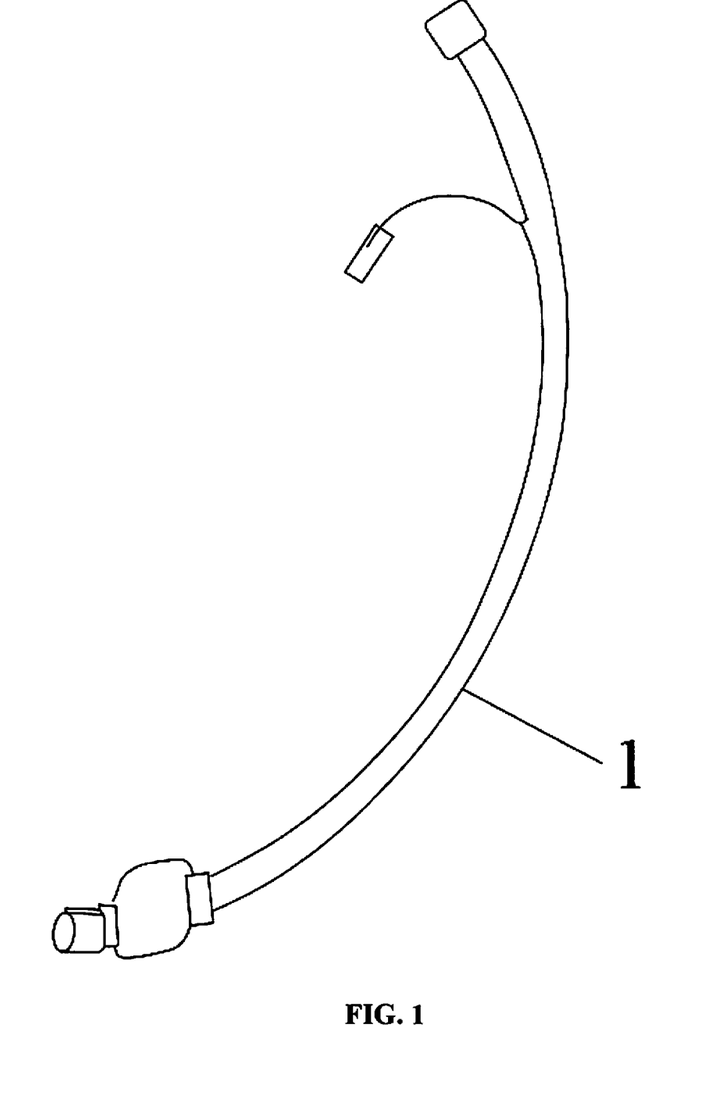
FIG. 1 is a structural schematic diagram of a tracheal intubation with automatic sputum excretion by unidirectional sputum flow according to the present disclosure.
Figure 2:
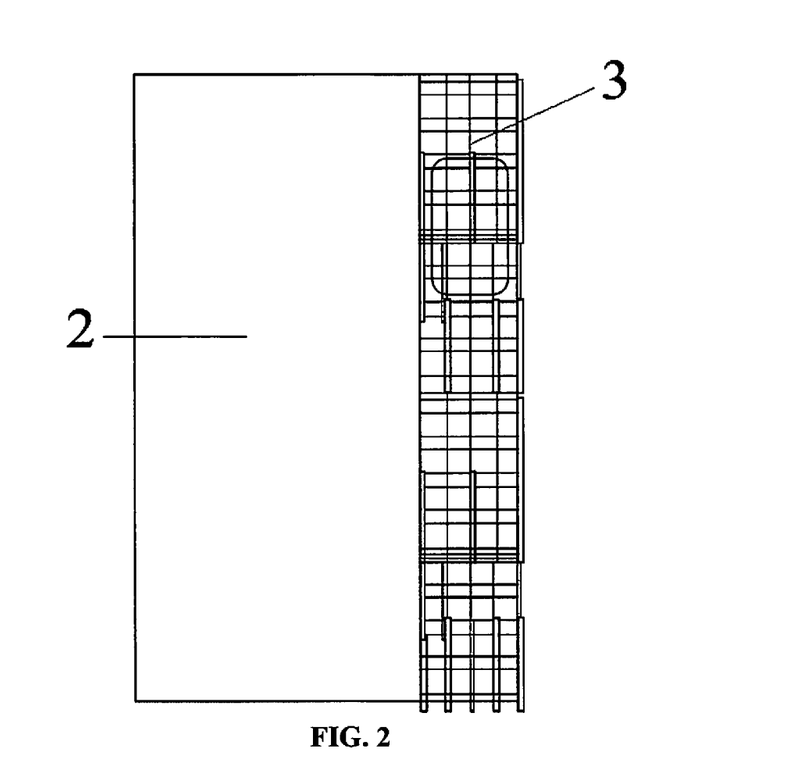
FIG. 2 is a partial structural schematic diagram of a tube wall of an tracheal intubation with automatic sputum excretion by unidirectional sputum flow according to the present disclosure in an expanding state.

It should be noted that, as shown in FIGS. 2 and 3, the unidirectional sputum-flow structure in this embodiment is preferably laid on the entire inner wall 2 of the tracheal intubation during production.

In the description of the present disclosure, it should be noted that, orientation or position relationships indicated by terms such as "left", "right", and "inner" are orientation or position relationships based on the accompanying drawings, which are only used to facilitate the description of the present disclosure and simplify the description, but do not indicate or imply that the device or element referred to must have a specific orientation, or be constructed and operated in a specific orientation, and therefore cannot be construed as a limitation to the present disclosure.

The principle and the implementation mode of the present disclosure are explained by using specific examples in the present specification, and the above description of the embodiments is only used to help understand the method and the core idea of the present disclosure; meanwhile, for a person skilled in the art, it may be changed in the specific embodiments and the application range according to the idea of the present disclosure. In conclusion, the contents of the description should not be construed as limitations on the disclosure.

What is claimed is:

1. A tracheal intubation tube with automatic sputum excretion by unidirectional sputum flow, comprising:
   a layer of unidirectional sputum-flow structure laid on an inner wall of the tracheal intubation tube; wherein the unidirectional sputum-flow structure comprises a plurality of partition plates evenly arranged on the inner wall in a circumferential direction, and a lengthwise direction of each of the plurality of partition plates is the same as an axial direction of the tracheal intubation tube, a widthwise direction of each of the plurality of partition plates is the same as a radial direction of the tracheal intubation tube, and a plurality of curved plates are provided at intervals between adjacent two of the plurality of partition plates, one end of each curved plate away from the inner wall bends towards one end of the tracheal intubation tube, and curved directions of the plurality of curved plates are the same, and wherein a hook-shaped portion is further provided at the one end of each curved plate away from the inner wall, the hook-shaped portion is L-shaped, and one end of the hook-shaped portion away from a curved plate is parallel to the inner wall and faces the curved plate.

2. The tracheal intubation tube with automatic sputum excretion by unidirectional sputum flow as claimed in claim 1, wherein the plurality of curved plates are hermetically connected to the inner wall of the tracheal intubation tube and the plurality of curved plates are hermetically connected to partition plates that are adjacent to the plurality of curved plates.

3. The tracheal intubation tube with automatic sputum excretion by unidirectional sputum flow as claimed in claim 1, wherein one end of each partition plate away from the inner wall is closer to a center of the tracheal intubation tube than the one end of each curved plate away from the inner wall.

4. The tracheal intubation tube with automatic sputum excretion by unidirectional sputum flow as claimed in claim 1, wherein the plurality of partition plates are evenly distributed on the inner wall in the circumferential direction of 360 degrees.

* * * * *